US009358843B2

(12) United States Patent
Nakamura et al.

(10) Patent No.: US 9,358,843 B2
(45) Date of Patent: Jun. 7, 2016

(54) TIRE

(75) Inventors: Takamitsu Nakamura, Higashiyamato (JP); Shungo Fujita, Kokubunji (JP)

(73) Assignee: BRIDGESTONE CORPORATION, Tokyo (JP)

(*) Notice: Subject to any disclaimer, the term of this patent is extended or adjusted under 35 U.S.C. 154(b) by 959 days.

(21) Appl. No.: 13/575,836

(22) PCT Filed: Jan. 28, 2011

(86) PCT No.: PCT/JP2011/051758
§ 371 (c)(1),
(2), (4) Date: Oct. 5, 2012

(87) PCT Pub. No.: WO2011/093452
PCT Pub. Date: Aug. 4, 2011

(65) Prior Publication Data
US 2013/0020002 A1    Jan. 24, 2013

(30) Foreign Application Priority Data

Jan. 29, 2010  (JP) .................................. 2010-019171

(51) Int. Cl.
*B60C 11/13* (2006.01)
*B60C 11/12* (2006.01)
*B60C 11/03* (2006.01)

(52) U.S. Cl.
CPC ......... *B60C 11/1384* (2013.04); *B60C 11/0304* (2013.04); *B60C 11/0306* (2013.04);
(Continued)

(58) Field of Classification Search
CPC ............ B60C 11/0304; B60C 11/0306; B60C 11/1384; B60C 11/1392; B60C 11/04; B60C 11/042; B60C 11/1376; B60C 2011/0381; B60C 2011/0383
See application file for complete search history.

(56) References Cited

U.S. PATENT DOCUMENTS

2006/0011279 A1    1/2006  Miyasaka
2010/0089509 A1    4/2010  Ochi
(Continued)

FOREIGN PATENT DOCUMENTS

CN         1708417 A    12/2005
CN      101636288 A     1/2010
(Continued)

OTHER PUBLICATIONS

Japanese Office Action, dated Oct. 1, 2013, issued in counterpart Japanese Patent Application No. 2010-019171.
(Continued)

*Primary Examiner* — Steven D Maki
*Assistant Examiner* — Robert Dye
(74) *Attorney, Agent, or Firm* — Sughrue Mion, PLLC

(57) ABSTRACT

In a pneumatic tire 10, inclined grooves 120, 170 are formed, the groove 120 with groove depth becoming larger and groove width in circumferential-direction becoming smaller as the groove 120 extends toward the inner side in width-direction, the groove 170 with groove depth becoming larger and groove width in the circumferential-direction becoming smaller as the groove 170 extends toward the outer side in the width-direction. An outer end portion of the groove 120 in the width-direction is continuous with a land portion 110 and an inner end portion of the groove 120 in the width-direction extends toward circumferential groove 22 along an end portion of a land portion 160 in the circumferential-direction. An inner end portion of the groove 170 in the width-direction is continuous with the land portion 160 and the groove 170 extends along an inner end portion of the land portion 110 in the width-direction.

7 Claims, 9 Drawing Sheets

(52) U.S. Cl.
CPC ......... *B60C11/1323* (2013.04); *B60C 11/1392* (2013.04); *B60C 2011/0365* (2013.04); *B60C 2011/0369* (2013.04); *B60C 2011/0372* (2013.04); *B60C 2011/0381* (2013.04); *B60C 2011/0383* (2013.04)

(56) References Cited

U.S. PATENT DOCUMENTS

2010/0096054 A1    4/2010  Kiwaki
2011/0297284 A1*  12/2011  Montesello et al. ....... 152/209.8

FOREIGN PATENT DOCUMENTS

| | | | |
|---|---|---|---|
| EP | 1120295 | A2 | 8/2001 |
| EP | 2028025 | A1 | 2/2009 |
| JP | 09-002024 | * | 1/1997 |
| JP | 2003-191715 | * | 7/2003 |
| JP | 2003-326920 | A | 11/2003 |
| JP | 2003326918 | A | 11/2003 |
| JP | 2006274049 | A | 10/2006 |
| JP | 2008149995 | A | 7/2008 |
| JP | 2008201379 | A | 9/2008 |
| WO | 2008126551 | A1 | 10/2008 |

OTHER PUBLICATIONS

Communication dated Mar. 5, 2015, issued by the European Patent Office in corresponding European Application No. 11737162.5.
Chinese Official Action Letter, dated Jun. 5, 2014, issued in counterpart Chinese Patent Application No. 201180007483.2.

* cited by examiner (a)

(b)

TIRE

CROSS REFERENCE TO RELATED APPLICATIONS

This application is a National Stage of International Application No. PCT/JP2011/051758 filed on Jan. 28, 2011, which claims priority from Japanese Patent Application No. 2010-019171, filed on Jan. 29, 2010, the contents of all of which are incorporated herein by reference in their entirety.

TECHNICAL FIELD

The present invention relates to a tire including block-shaped land portions which are adjacent to a circumferential groove and which are provided outside the circumferential groove in a tread width direction, and particularly relates to a tire capable of achieving both of a wet performance and a driving stability even when a rolling resistance is reduced.

BACKGROUND ART

Nowadays, as consideration on the environment increases, various methods for reducing the rolling resistance of a tire are proposed to contribute to the fuel efficiency of an automobile.

For example, a method is known in which a rubber with a low rolling resistance is used for a tread (see Patent Document 1). Moreover, a method is also known for reducing a rolling resistance while securing a certain level of driving stability by setting a ratio (TW/SW) of a tread width (TW) to a section width (SW) of the tire within a certain range (for example, 0.6 to 0.75) (see Patent Document 2).

PRIOR ART DOCUMENT

Patent Document

Patent Document 1: Japanese Patent Application Publication No. 2006-274049 (Page 3 and FIGS. 1 and 2)
Patent Document 2: Japanese Patent Application Publication No, 2008-201379 (Page 4 and FIG. 1)

SUMMARY OF THE INVENTION

However, the tires with low rolling resistance described above generally have drawbacks as described below. Specifically, when the rubber with low rolling resistance is used, a wet performances such as a braking power and traction on a wet road surface tend to deteriorate. Moreover, when a tire having the TW/SW set within the certain range (0.6 to 0.75) and a tire having the TW/SW set to a general value (0.8 or more) are compared, the tire having the TW/SW set within the certain range tends to have a lower driving stability than the tire having the TW/SW set to the general value, provided that the SWs of the respective tires are the same.

The present invention has been made in view of the situations described above, and an objective thereof is to provide a tire which achieves both of a higher wet performance and a higher driving stability even when considerations are made on reduction of rolling resistance.

In order to solve the above-mentioned problem, the present invention has features as described below. The first feature of the present invention is summarized as a tire (pneumatic tire 10), in which a circumferential groove (circumferential groove 22) extending a tire circumferential direction is formed and plurality of block-shaped land portions (block-shaped land portion 100) are provided in the tire circumferential direction, outside the circumferential groove in a tread width direction, wherein a first inclined groove (inclined groove 120) and a second inclined groove (inclined groove 170) are formed, the first inclined groove with a groove depth becoming larger and a groove width in the tire circumferential direction becoming smaller as the first inclined groove extends toward the inner side in the tread width direction, the second inclined groove with a groove depth becoming larger and a groove width in the tire circumferential direction becoming smaller as the second inclined groove extends toward the outer side in the tread width direction, each of the block-shaped land portions includes a first land portion (land portion 110) and a second land portion (land portion 160) which is adjacent to the first land portion and which is located inside the first land portion in the tread width direction, an outer end portion (end portion 122) of the first inclined groove in the tread width direction is continuous with the first land portion and an inner end portion (end portion 121) of the first inclined groove in the tread width direction extends toward the circumferential groove along an end portion (end portion 161) of the second land portion in the tire circumferential direction, and an inner end portion (end portion 173) of the second inclined groove in the tread width direction is continuous with the second land portion and the second inclined groove extends along an inner end portion (end portion 111) of the first land portion in the tread width direction.

The second feature of the present invention according the first feature of the present invention is summarized as the inner end portion of the first inclined groove in the tread width direction communicates with the circumferential groove.

The third feature of the present invention according to the first or second features of the present invention is summarized as the groove width (groove width W2) of the second inclined groove in the tire circumferential direction is larger than the groove width (groove width W1) of the first inclined groove in the tire circumferential direction.

The fourth feature of the present invention according to the third feature of the present invention is summarized as an inter-block microgroove (inter-block microgroove 180) extending in the tread width direction is formed between adjacent ones of the block-shaped land portions, and the inter-block microgroove communicates with one end portion (end portion 171) of the second inclined groove in the tire circumferential direction.

The fifth feature of the present invention according to the fourth feature of the present invention is summarized as the inter-block microgroove is adjacent to the first inclined groove.

The sixth feature of the present invention according to the fourth or fifth features of the present invention is summarized as the outer end portion (end portion 122) of the first inclined groove in the tread width direction is in contact with another end portion (end portion 172) of the second inclined groove in the tire circumferential direction in a plan view of a tread surface of the tire, and a height in a tire radial direction at a contact portion (contact portion P) where the outer end portion of the first inclined groove in the tread width direction and the other end portion of the second inclined groove in the tire circumferential direction are in contact with each other is substantially the same as a height of the tread surface (tread surface T) of the block-shaped land portions.

The seventh feature of the present invention according to the fourth to sixth feature of the present invention is summarized as a rib-shaped land portion (rib-shaped land portion 200) is provided, the rib-shaped land portion being adjacent to the circumferential groove and extending in the tire circumferential direction substantially parallel to the block-shaped land portion with the circumferential groove interposed therebetween, a rib microgroove (rib microgroove 260) extending from one side end (side end 210a) to another side end (side end 210b) of the rib-shaped land portion is formed in the rib-shaped land portion, and an extending direction of the inter-block microgroove is substantially the same as an extending direction of the rib microgroove in the plan view of the tread surface of the tire.

Figure 2:
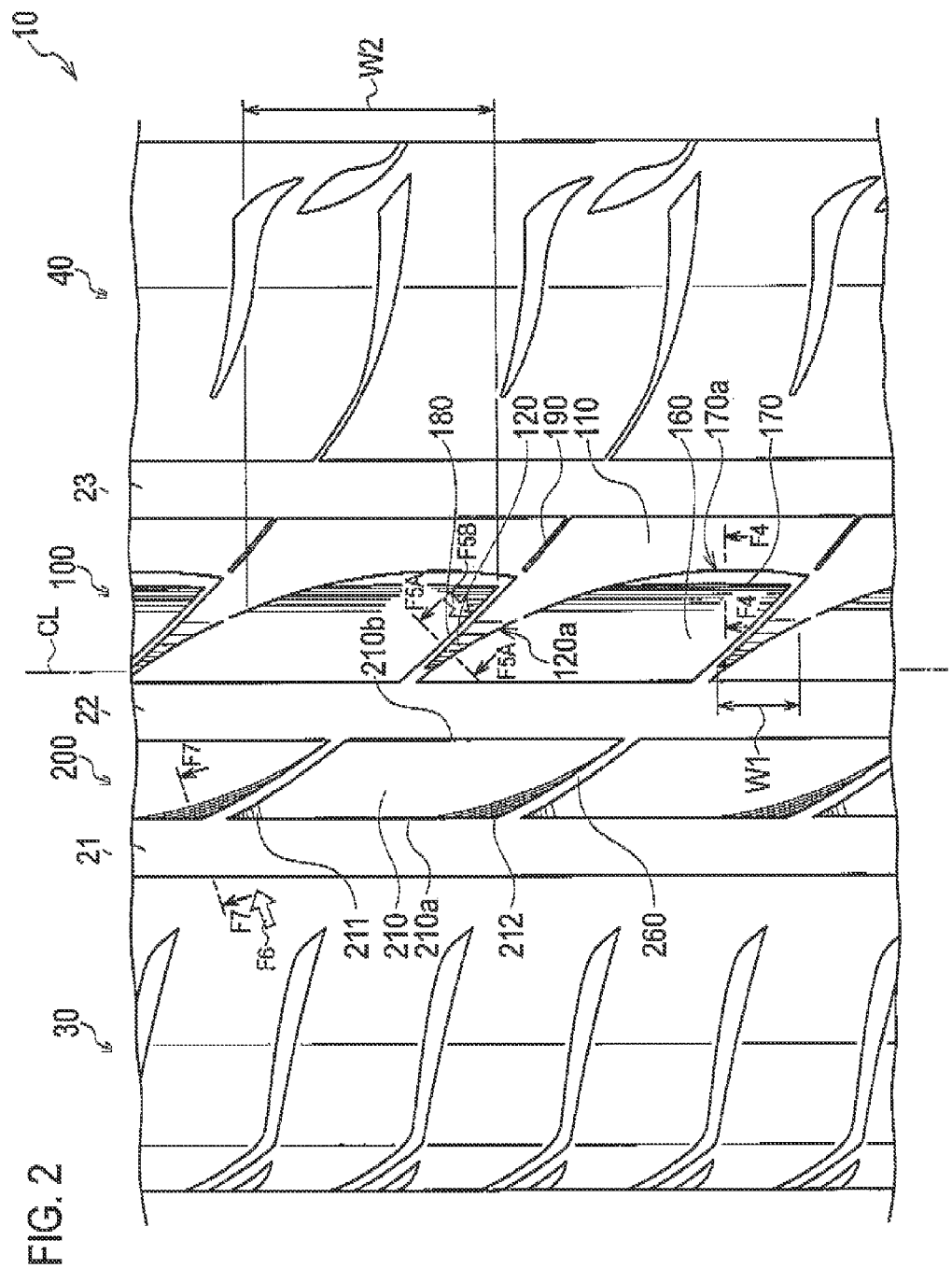
FIG. 2 is a developed view of a tread of the pneumatic tire 10 in the embodiment of the present invention.
Figure 5:
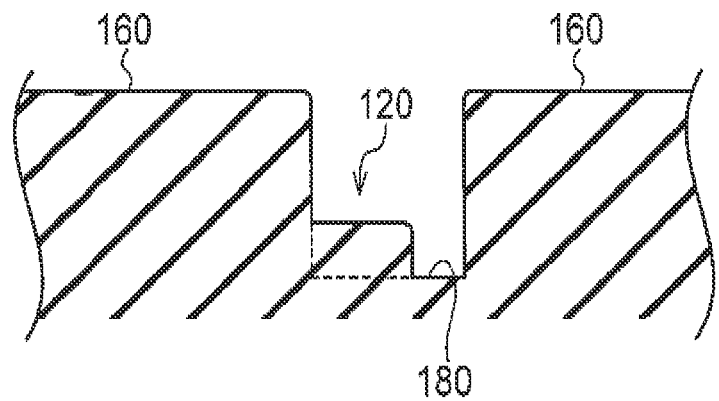
Figure 5:
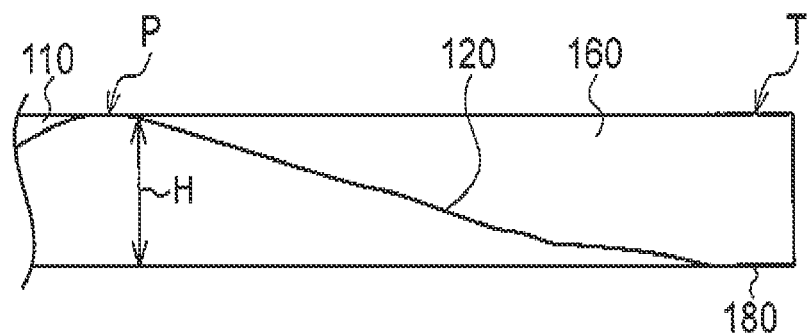

Part (a) of FIG. 5 is a cross-sectional view of the pneumatic tire 10 taken along the line F5A-F5A shown in FIG. 2, and part (b) of FIG. 5 is a view in the direction of the arrow F5E shown in FIG. 2.

Figure 6:
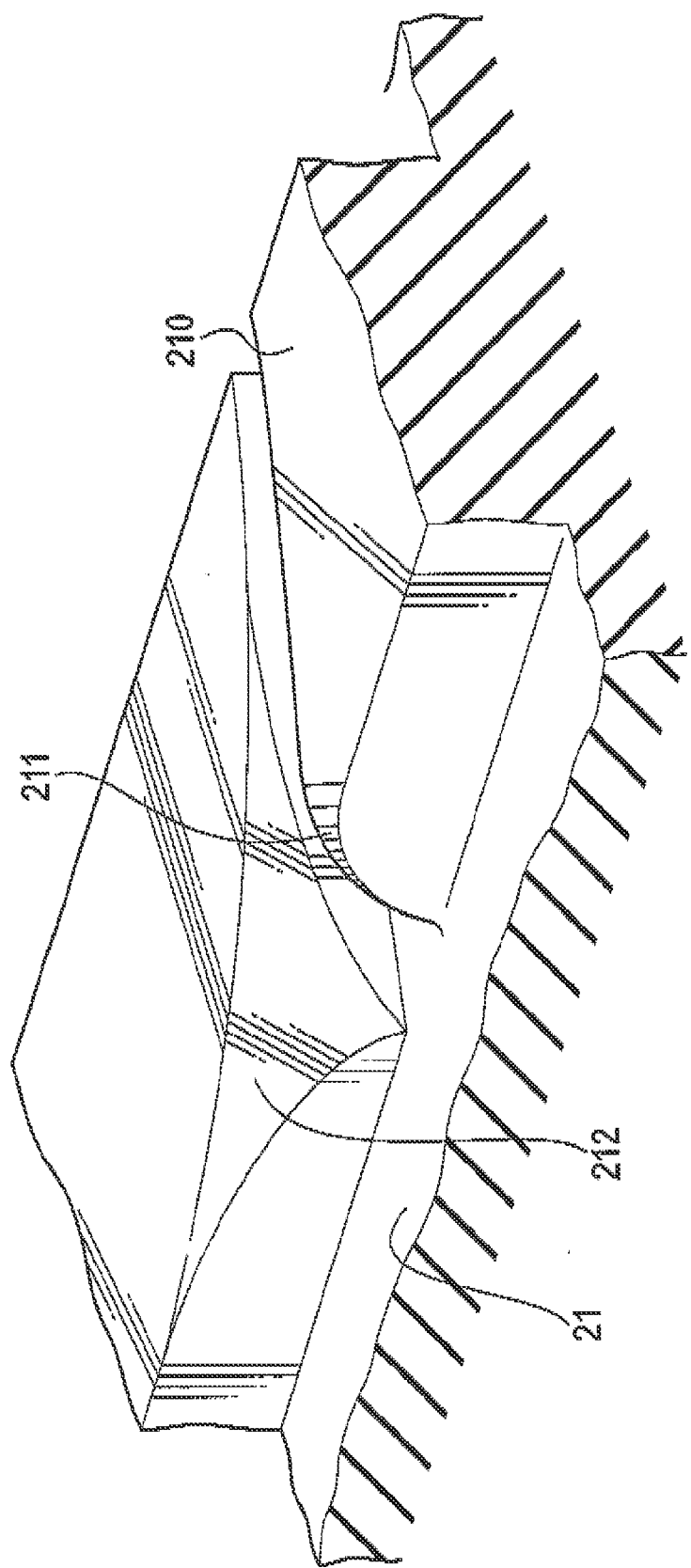

FIG. 6 is a view in the direction of the arrow P6 shown in FIG. 2.

Figure 7:
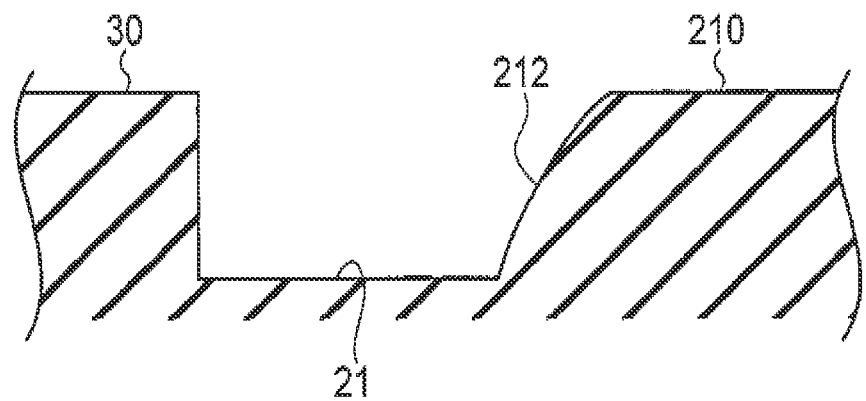

FIG. 7 is a cross-sectional view of the pneumatic tire 10 taken along the line F7-F7 shown in FIG. 2.

Figure 8:
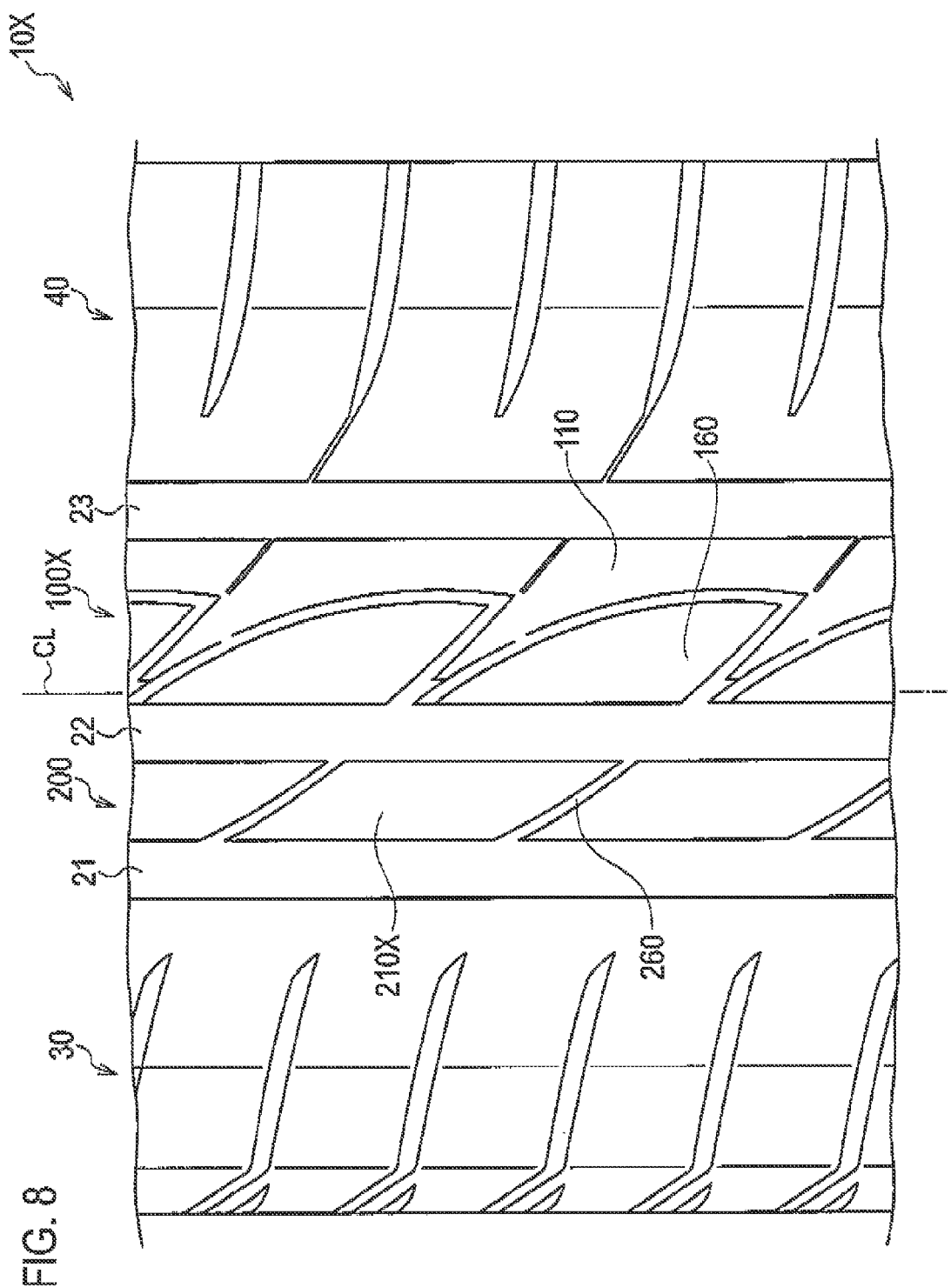

FIG. 8 is a developed view showing a tread of a pneumatic tire 10X of a comparative example.

Figure 9:
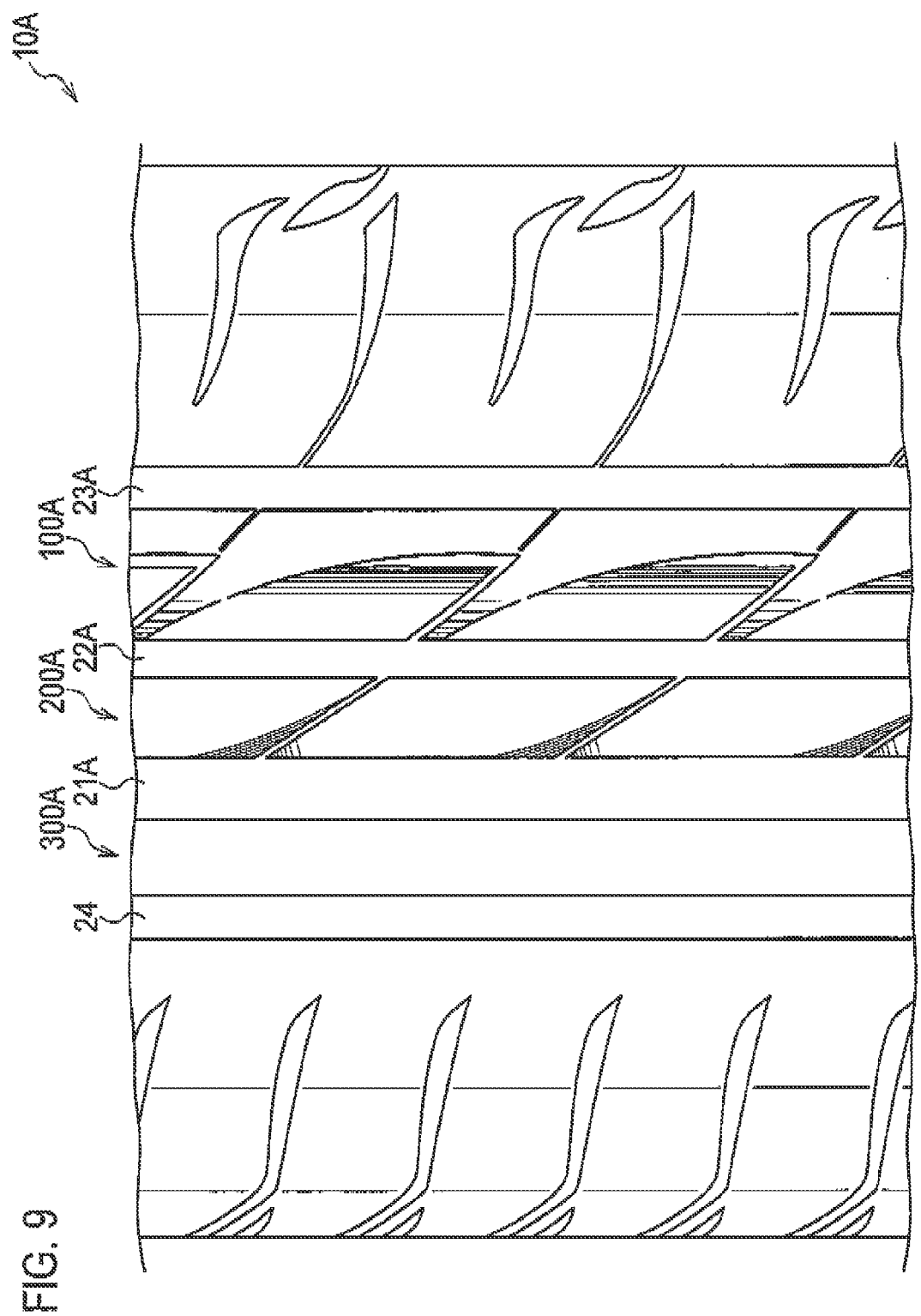

FIG. 9 is a developed view showing a tread of a pneumatic tire 10A of a modified example of the present invention.

MODE FOR CARRYING OUT THE INVENTION

Next, an embodiment of a tire of the present invention is described with reference to the drawings. Note that, in the following description of the drawings, same or similar reference signs denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

(1) Schematic Configuration of Tire

Figure 1:
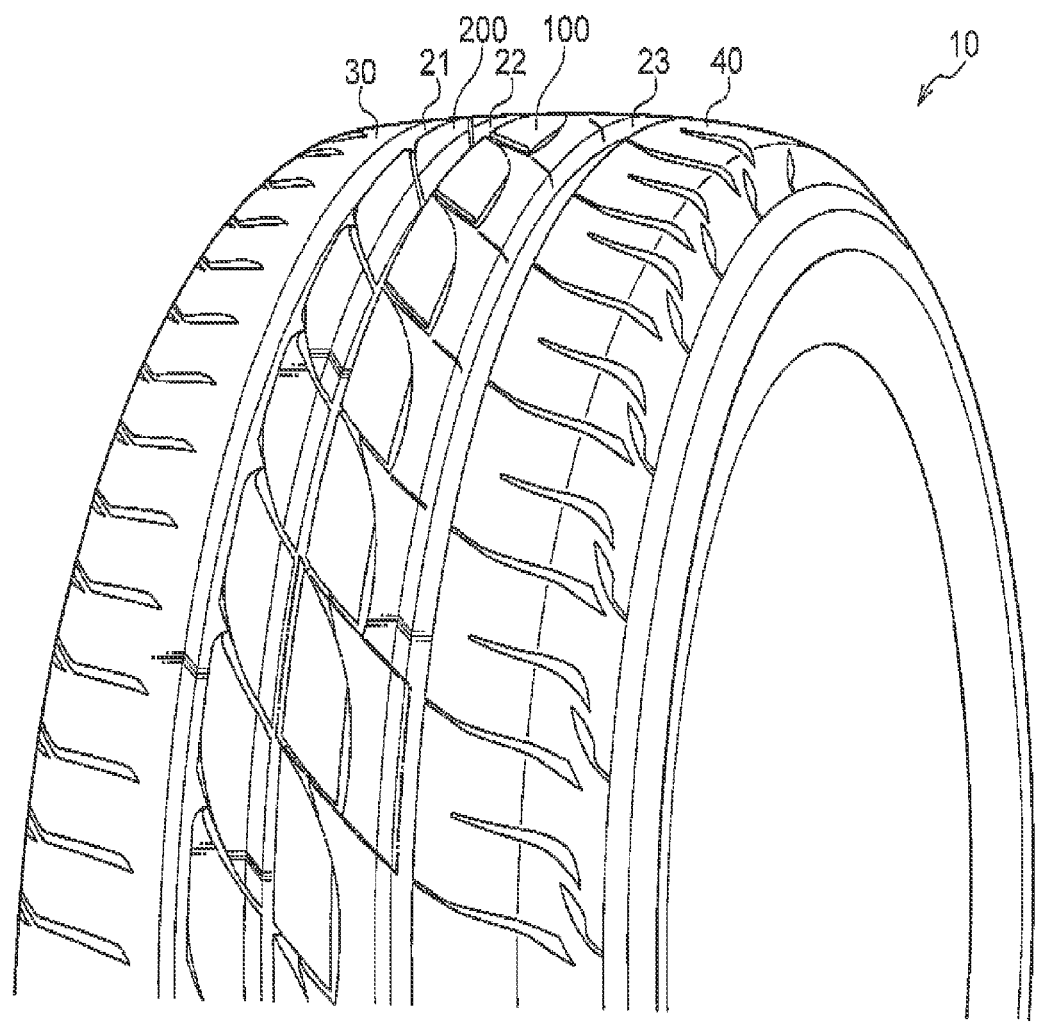
FIG. 1 is a perspective view of a pneumatic tire 10 in an embodiment of the present invention.

FIG. 1 is a perspective view of a pneumatic tire 10 of the embodiment. The pneumatic tire 10 is a tire which uses a rubber with low rolling resistance for a tread and which takes in consideration fuel efficiency of an automobile to be fitted with the pneumatic tire 10. Note that the pneumatic tire 10 may be filled with an inert gas such as nitrogen gas.

As shown in FIG. 1, the pneumatic tire 10 is provided with a plurality of land portions extending in a tire circumferential direction. Specifically, the pneumatic tire 10 is provided with a shoulder land portion 30, a shoulder land portion 40, block-shaped land portions 100, and a rib-shaped land portion 200.

The shoulder land portion 30 and the shoulder land portion 40 are provided respectively in tread shoulder portions of the pneumatic tire 10.

The block-shaped land portions 100 and the rib-shaped land portion 200 are provided between the shoulder land portion 30 and the shoulder land portion 40. A circumferential groove 21 extending in the tire circumferential direction is formed between the shoulder land portion 30 and the rib-shaped land portion 200. Moreover, a circumferential groove 22 is formed between the block-shaped land portions 100 and the rib-shaped land portion 200, and a circumferential groove 23 is formed between the shoulder land portion 40 and the block-shaped land portions 100.

A portion surrounded by dot-dash lines is the block-shaped land portion 100 and a plurality of block-shaped land portions 100 are provided in tire circumferential direction. Note that "block-shaped land portions" includes not only land portions clearly divided from each other by lug grooves or the like but also land portions defined from each other by sipes and microgrooves as seen in the block-shaped land portions 100 of the embodiment.

Moreover, the rib-shaped land portion 200 extends continuously in the tire circumferential direction and is a land portion narrower and longer than the block-shaped land portions 100. Note that the rib-shaped land portion 200 need not be necessarily continuous in the tire circumferential direction, and, as shown in FIG. 1, may be divided by microgrooves or the like extending in a tread width direction.

(2) Shapes of Block-shaped Land Portions 100 and Rib-Shaped Land Portion 200

Figure 3:
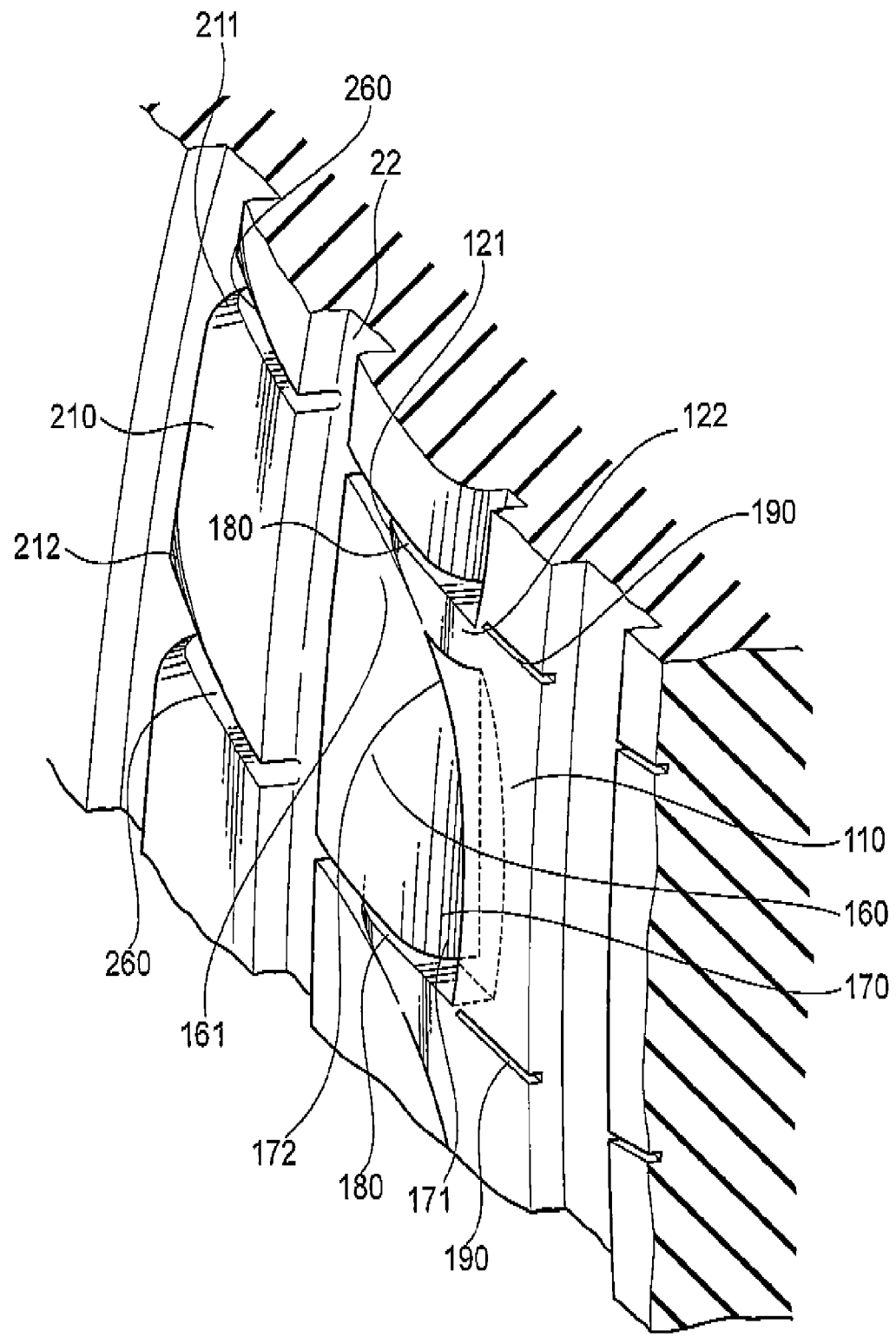
FIG. 3 is a perspective view of block-shaped land portions 100 and a rib-shaped land portion 200 in the embodiment of the present invention.

FIG. 2 is a developed view of the tread of the pneumatic tire 10. FIG. 3 is a perspective view of the block-shaped land portions 100 and the rib-shaped land portion 200.

(2.1) Block-Shaped Land Portion 100

The block-shaped land portion 100 includes a land portion 110 and a land portion 160. The land portion 110 is adjacent to the circumferential groove 23 and is located on the inner side of the circumferential groove 23 in the tread width direction. The land portion 150 is adjacent to the land portion 110 and the circumferential groove 22 formed near a tire equator line CL. The land portion 160 is located on the inner side of the land portion 110 in the tread width direction with respect to the tire equator line CL. In the embodiment, the land portion 110 forms a first land portion and the land portion 150 forms a second land portion.

Moreover, an inclined groove 120 and an inclined groove 170 are formed in the block-shaped land portion 100. The inclined groove 120 has a wedge shape. Specifically, the groove depth of the inclined groove 120 becomes larger and the groove width thereof in the tire circumferential direction becomes smaller as the groove 120 extends toward the inner side in the tread width direction. The inclined groove 120 extends obliquely toward the inner side in the tread width direction while being adjacent to the land portion 110.

Meanwhile, the groove depth of the inclined groove 170 becomes larger and the groove width thereof in the tire circumferential direction becomes smaller as the groove 170 extends toward the outer side in the tread width direction. In the embodiment, the inclined grooves 120 form the first inclined grooves and the inclined grooves 170 form the second inclined grooves. A side end 120a of inclined groove 120 and a side end 170a of inclined groove 170 have an arc shape in a plan view of the tread surface of the pneumatic tire 10. The side end 120a and the side end 170a are formed to be smoothly continuous with each other.

An inner end portion 121 of inclined grove 120 in the tread width direction extends toward the circumferential groove 22, along an end portion 151 of the land portions 160 in the tire circumferential direction. In the embodiment, the end portion 121 communicates with the circumferential groove 22. Moreover, an outer end portion 122 of inclined groove 120 in the tread width direction is continuous with the land portions 110.

In the embodiment, an inter-block microgroove 180 is formed between each adjacent ones of the block-shaped land portions 100. The inter-block microgroove 180 extends in the tread width direction. Specifically, the inter-block microgroove 180 communicates with an end portion 171 one end portion) of the inclined groove 170 in the tire circumferential direction. Moreover, the inter-block microgroove 180 is adjacent to the inclined groove 120 of an adjacent one of the block-shaped land portions 100.

Furthermore, in the embodiment, a sipe 190 is formed along the extending direction of the inter-block microgroove 180. As similar to the inter-block microgroove 180, the sipe 190 is formed between each adjacent ones of the block-shaped land portions 100. The inter-block microgrooves 180 and the Sipes 190 are formed on a straight line extending obliquely to the tire circumferential direction. Moreover, the groove width of the sipe 190 is narrower than that of the inter-block microgroove 180.

(2.2) Rib-shaped Land Portion 200

The rib-shaped land portion 200 includes land portions 210 and rib microgrooves 260. The rib microgrooves 260 are each formed between adjacent ones of the land portions 210. The rib-shaped land portion 200 is adjacent to the circumferential groove 22 and extends substantially parallel to the block-shaped land portions 100 in the tire circumferential direction with the circumferential groove 22 therebetween.

The rib microgrooves 260 extend from one side end 210a of the rib-shaped land portion 200 to the other side end 210b thereof. Hence, the rib-shaped land portion 200 is divided into the a plurality of land portions 210. The extending direction of the rib microgrooves 260 is the same as that of the inter-block microgrooves 180. In other words, the extending direction of the inter-block microgrooves 180 are substantially the same as the extending direction of the rib microgrooves 260 in the plan view of the tread surface of the pneumatic tire 10.

(3) Shapes of Inclined Grooves

Figure 4:
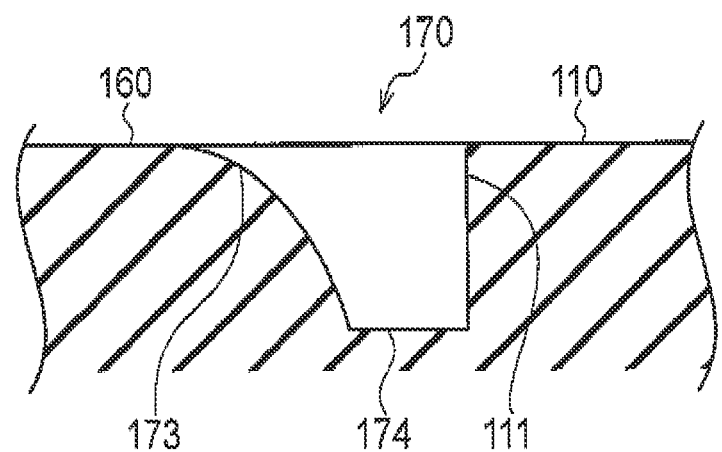
FIG. 4 is a cross-sectional view of the pneumatic tire 10 taken along the line F4-F4 shown in FIG. 2.

FIG. 4 is a cross-sectional view of the pneumatic tire 10 taken along the line F4-F4 shown in FIG. 2. Similarly, part (a) of FIG. 5 is a cross-sectional view of the pneumatic tire 10, taken along the line F5A-F5A shown in FIG. 2 and part (b) of FIG. 5 is a view in the direction of the arrow F5 shown in FIG. 2.

(3.1) Inclined Groove 170

As shown in FIG. 4, the inclined groove 170 is formed between the land portion 110 and the land portion 160. Specifically, an inner end portion 173 of the inclined groove 170 in the tread width direction is continuous with the land portion 160. Moreover, the inclined groove 170 extends along an inner end portion 111 of the land portion 110 in the tread width direction. The inclined groove 170 is inclined in such a way that the groove depth thereof gradually increases from the land portion 160 toward the land portions 110, and the groove depth is largest at a groove bottom 174.

(3.2) Inclined Groove 120

As shown in parts (a) and (b) of FIG. 5, the inclined groove 120 is formed between the land portions 160 adjacent to each other in the tire circumferential direction. Specifically, the inclined groove 120 and the inter-block microgroove 180 are formed between the adjacent land portions 160. The inclined groove 120 is inclined in such a way that the groove depth thereof gradually increases toward the circumferential groove 22. The groove depth of the inter-block microgroove 180 is larger than that at the deepest portion of the inclined groove 120.

(3.3) Relationship Between Inclined Groove 120 and Inclined Groove 170

As shown in FIG. 2, a groove width W2 of the inclined groove 170 in the tire circumferential direction is wider than a groove width W1 of the inclined groove 120 in the tire circumferential direction. Moreover, as shown in FIGS. 2 and 3, in the plan view of the tread surface of the pneumatic tire 10, the outer end portion 122 of the inclined groove 120 in the tread width direction contacts the end portion 172 (other end portion) of the inclined grooves 170 in the tire circumferential direction. Furthermore, as shown in part (b) of FIG. 5, a height H in a tire radial direction at a contact portion P between the inclined groove 120 and the inclined groove 170 is substantially the same as the height of a tread surface T of the block-shape land portion 100.

(4) Shape of Land Portion 210

FIG. 6 is a view in the direction of the arrow 176 shown in FIG. 2. FIG. 7 is a sectional view of the pneumatic tire 10 taken along the line F7-F7 shown in FIG. 2. As shown in FIG. 6, a protruding end portion 211 located at one end of each land portion 210 in the tire circumferential direction is chamfered in an arc shape toward a groove bottom of the circumferential groove 21 in a side view of the land portion 210.

Moreover, as shown in FIGS. 6 and 7, an inclined surface 212 is formed at the other end of the land portion 210 in the tire circumferential direction. The inclined surface 212 is inclined toward the groove bottom of the circumferential groove 21.

(5) Comparative Evaluation

Next, in order to further clarify the effects of the present invention, descriptions are given below of comparative evaluations performed by using pneumatic tires of a comparative example and an example. Specifically, (5.1) Configurations of Respective Pneumatic Tires and (5.2) Evaluation Results are described. Note that the present invention is not limited by these examples at all.

(5.1) Configurations of Respective Pneumatic Tires

First, the configurations of the respective pneumatic tires are briefly described with reference to the drawings FIG. 8 is a developed view of a tread of a pneumatic tire 10X of the comparative example.

As shown in FIG. 8, the inclined grooves 120 and the inclined grooves 170 are not formed in block-shaped land portions 100X of the pneumatic tire 10X of the comparative example. In addition, the protruding end portions 211 and the inclined surfaces 212 are not formed in land portions 210X, either.

Meanwhile, the pneumatic tire 10 of the example is the tire described in the embodiment (see FIG. 1). Specifically, the inclined groove 120 and the inclined groove 170 are formed in the block-shaped land portions 100. In addition, the protruding end portion 211 and the inclined surface 212 are formed in the land portion 210.

(5.2) Evaluation Results

Next, results of the evaluations performed by using the pneumatic tires are described with reference to Table 1. Specifically, (5.2.1) Hydroplaning Evaluation and (5.2.2) Driving Stability Evaluation (5.2.2) are described.

TABLE 1

|  |  | Comparative Example | Example |
|---|---|---|---|
| Hydroplaning Evaluation |  | 100 | 100 |
| Driving Stability Evaluation | Wet Road Surface | 100 | 103 |
|  | Dry Road Surface | 100 | 105 |

(5.2.1) Hydroplaning Evaluation

Vehicles fitted with the respective types of tires were made to travel at a speed of 80 km/h. Then, only the right tires fitted to each vehicle were made to enter a rainy road with a water depth of 10 mm and the vehicle was accelerated. An index of 100 was assigned to a speed (hydroplaning occurrence speed) at which a difference (slip) occurred in speeds of the right and left tires fitted to the vehicle fitted with the pneumatic tires 10X of the comparative example and a speed at which the hydroplaning occurred in the pneumatic tires 10 of the example was indicated in an index. A larger index means a better drainage.

As shown in Table 1, it was found from the result of the evaluation that the speed at which hydroplaning occurred in the vehicle fitted with the pneumatic tires 10 of the example was similar to that in the vehicle fitted with the pneumatic tires 10X of the comparative example and the drainage (i.e. wet performance) can be thus secured.

(5.2.2) Driving Stability Evaluation

On test courses respectively of a dry road surface and a wet road surface, a professional driver performed a feeling evaluation of driving stability for the vehicle fitted with the pneumatic tires 10 of the embodiment. In this evaluation, an index of 100 was assigned to the driving stability (while traveling straight, while cornering, and in similar situation) of the vehicle fitted with the pneumatic tires 10X of the comparative, example. A larger index means a better driving stability.

It was found from the result of the evaluation that the vehicle fitted with the pneumatic tires 10 of the example had a better driving stability on both of the dry road surface and the wet road, surface than the vehicle fitted with the pneumatic tires 10X of the comparative example.

(6) Operations and Effects

In the pneumatic tire 10, the inclined groove 120 and the inclined groove 170 are formed in each block-shaped land portions 100 at positions outside the circumferential groove 22 in the tread width direction, in a state where the pneumatic tire 10 is fitted to the vehicle. The inclined groove 120 and the inclined groove 170 are provided at different positions in the tread width direction. Moreover, the extending direction of the inclined groove 120 and the extending direction of the inclined groove 170, i.e. the inclination direction of the inclined groove 120 and the inclination direction of the inclined groove 170 are different from each other.

Accordingly, the stiffness of the block-shaped land portion 100 can be increased while the drainage in the block-shaped land portion 100 is secured. In other words, the pneumatic tire 10 can achieve both of the higher wet performance and the higher driving stability. Moreover, the block-shaped land portion 100 is located outside the circumferential groove 22 in the tread width direction when the pneumatic tire 10 is fitted to the vehicle. Accordingly, the block-shaped, land portion 100 can be located closer to an outer portion in the tread width direction which has a large effect on the driving stability during cornering. In other words, the pneumatic tire 10 can particularly improve the driving stability during cornering.

In the embodiment, the inner end portion 121 of the inclined grooves 120 in the tread width direction communicate with the circumferential groove 22. Moreover, the groove width W2 of the inclined groove 170 is wider than the groove width W1 of the inclined groove 120. Accordingly, it is possible to improve the drainage in the tire circumferential direction by using the inclined grooves 170 while allowing water to be drained from the inclined grooves 120 to the circumferential groove 22.

In the embodiment, the height of contact portion P between each inclination groove 120 and the corresponding inclination groove 170 is substantially the same as the height of the tread surface T. Accordingly, the stiffness of the block-shaped land portions 100 is improved compared to the case where the inclined groove 120 and the inclined groove 170 are separately formed in each block-shaped land portion 100. Moreover, the inter block microgroove 180 communicates with the end portion 171 of the inclined grooves 170 and is adjacent to the inclined grooves 120. Accordingly, the drainage in the block-shaped land portions 100 can be further improved. Moreover, in the embodiment, the extending direction of the inter-stock microgrooves 180 is substantially the same as the extending direction of the rib microgrooves 260. This configuration contributes to smooth water drainage through the inter-block microgrooves 180 and the rib microgrooves 260. In other words, the pneumatic tire 10 can further improve the driving stability while securing the wet performance.

In the embodiment, the protruding end portions 211 of the land portions 210 are chamfered in the arc shape in the side view of the land portions 210. Moreover, the inclined surfaces 212 inclined toward the groove bottom of the circumferential groove 21 are formed in the land portions 210. Accordingly, end portions of the land portions 210 in the tire circumferential direction can be prevented from being cores of uneven wear.

(7) Other Embodiments

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

For example, the embodiment of the present invention can be changed as follows. FIG. 9 is a developed view showing a tread of a pneumatic tire 10A of a modified example of the present invention. As shown in FIG. 9, circumferential grooves 21A to 23A and a circumferential groove 24 are formed in the pneumatic tire 10A. Block-shaped land portions 100A are formed between the circumferential groove 22A and the circumferential groove 23A. Moreover, a rib-shaped land portion 200A is formed between the circumferential groove 21A and the circumferential groove 22A. The shapes of the block-shaped land portions 100A and the rib-shaped land portion 200A are the same as the shapes of the block-shaped land portions 100 and the rib-shaped land portion 200 described above.

Compared to the pneumatic tire 10, the pneumatic tire 10A is further provided with a rib land portion 300A. The rib land portion 300A is a land portion having a simple shape in which rib microgrooves or the like are formed. Similar effects as those of the pneumatic tire 10 can be obtained also from the pneumatic tire 10A.

Moreover, in the embodiment describe above, the pneumatic tire 10 is the tire which uses the rubber with low rolling resistance and which takes in consideration fuel efficiency. However, the scope of application of the present invention is not limited to tires with low rolling resistance. Moreover, the scope of application of the present invention is not limited to pneumatic tires and may be applied to solid tires with a tread pattern as described above.

As described above, the present invention naturally includes various embodiments which are not described herein. Accordingly, the technical scope of the present invention should be determined only by the matters to define the invention in the scope of claims regarded as appropriate based on the description.

Note that the entire content of Japanese Patent Application. No. 2010-019171 (filed on Jan. 29, 2010) is incorporated herein by reference.

INDUSTRIAL APPLICABILITY

The present invention can provide a tire which achieves both of the higher wet performance and the higher driving stability even when considerations are made on reduction of rolling resistance. Hence, the present invention is effective in the automobile industry and the like.

EXPLANATION OF THE REFERENCE NUMERALS 10, 10A, 10X pneumatic tire
21 to 24, 21A to 23A circumferential groove
30, 40 shoulder land portion
100, 100A, 100X block-shaped land portion
111 end portion
120 inclined groove
120a side end
121, 122 end portion
160 land portion
161 end portion
170 inclined groove
170a side end
171, 172, 173 end portion
174 groove bottom
180 inter-block microgroove
190 sipe
200, 200A rib-shaped land portion
210, 210X land portion
210a, 210b side end
211 protruding end portion
212 inclined surface
260 rib microgroove
300A rib land portion
CL tire equator line
P contact portion
T tread

The invention claimed is:

1. A tire in which a first circumferential groove and a second circumferential groove extending in a tire circumferential direction are formed and a plurality of block-shaped land portions are provided in the tire circumferential direction, outside the first circumferential groove in a tread width direction, wherein
a first inclined groove and a second inclined groove are formed, the first inclined groove with a groove depth becoming larger and a groove width in the tire circumferential direction becoming smaller as the first inclined groove extends toward the inner side in the tread width direction, the second inclined groove with a groove depth becoming larger and a groove width in the tire circumferential direction becoming smaller as the second inclined groove extends toward the outer side in the tread width direction,
each of the block-shaped land portions includes a first land portion and a second land portion,
the first land portion, the second land portion, the first inclined groove, and the second inclined groove are disposed in an area partitioned by a first inter-block microgroove and a first sipe on a first side in the tire circumferential direction, a second inter-block microgroove and a second sipe on a second side in the tire circumferential direction, and by the first circumferential groove and the second circumferential groove in the tread width direction,
on the first side of the area in the tire circumferential direction, the first inclined groove and the first land portion continuous with the first inclined groove in the tread width direction are disposed and the first land portion extends toward the second side of the area in the tire circumferential direction,
on the second side of the area in the tire circumferential direction, the second land portion extending toward the first side of the area in the tire circumferential direction is disposed, and
the second inclined groove continuous with the second land portion is disposed between the first land portion and the second land portion in the tread width direction.

2. The tire according to claim 1, wherein an inner end portion of the first inclined groove in the tread width direction communicates with the first circumferential groove.

3. The tire according to claim 1, wherein a maximum groove width of the second inclined groove in the tire circumferential direction is larger than a maximum groove width of the first inclined groove in the tire circumferential direction.

4. The tire according to claim 3, wherein
in each partitioned area, the second inter-block microgroove communicates with an end portion of the second inclined groove on the second side in the tire circumferential direction.

5. The tire according to claim 4, wherein, in each partitioned area, the second inter-block microgroove is adjacent to a first inclined groove disposed in another partitioned area.

6. The tire according to claim 4, wherein
an outer end portion of the first inclined groove in the tread width direction is in contact with an end portion of the second inclined groove on the first side in the tire circumferential direction in a plan view of a tread surface of the tire, and
a height in a tire radial direction at a contact portion where the outer end portion of the first inclined groove in the tread width direction and the end portion of the second inclined groove on the first side in the tire circumferential direction are in contact with each other is substantially the same as a height of the tread surface of the block-shaped land portions.

7. The tire according to claim 4, wherein
a rib-shaped land portion is provided, the rib-shaped land portion being adjacent to the first circumferential groove and extending in the tire circumferential direction substantially parallel to the block-shaped land portion with the first circumferential groove interposed therebetween,
a rib microgroove extending from one side end to another side end of the rib-shaped land portion is formed in the rib-shaped land portion, and an extending direction of the first and second inter-block microgrooves is substantially the same as an extending direction of the rib microgroove in the plan view of the tread surface of the tire.

* * * * *